United States Patent [19]

Kosuge

[11] 4,131,886
[45] Dec. 26, 1978

[54] INDICATION SYSTEM
[75] Inventor: Shuichi Kosuge, Nagoya, Japan
[73] Assignee: Nippondenso Co., Ltd., Kariya, Japan
[21] Appl. No.: 778,171
[22] Filed: Mar. 16, 1977
[30] Foreign Application Priority Data Mar. 25, 1976 [JP] Japan .................................. 51/32947
Apr. 9, 1976 [JP] Japan .................................. 51/40654

[51] Int. Cl.² ............................................. G08B 19/00
[52] U.S. Cl. .............................. 340/378 R; 340/52 F; 340/518
[58] Field of Search ................. 340/52 F, 324 R, 325, 340/213, 412, 414, 413, 378 R

[56] References Cited
U.S. PATENT DOCUMENTS

| | | | |
|---|---|---|---|
| 3,925,752 | 12/1975 | Jensen | 340/52 F |
| 3,936,799 | 2/1976 | Hynes | 340/52 F |
| 3,987,439 | 10/1976 | Spaniola | 340/52 F |
| 4,034,336 | 7/1977 | Arai | 340/52 F |

Primary Examiner—Harold I. Pitts
Attorney, Agent, or Firm—Cushman, Darby & Cushman

[57] ABSTRACT

An indication system for indicating abnormal conditions on an indication drum. A rotary switch having a plurality of stationary contacts connected to a plurality of sensors and a movable contact connected to the indication drum is provided to control the rotation of the indication drum. Receiving an output signal of one of the sensors, the rotary switch rotates together with the indication drum until the movable contact comes into contact with one of the stationary contacts to which the output signal is applied. The indication drum, then, indicates one abnormal condition represented by this output signal. A manually-operated switch is further provided to forcibly rotate the movable contact. When the manually-operated switch is activated, the movable contact is caused to slide over the stationary contacts so as to detect another output signal representing another abnormal condition to be indicated.

11 Claims, 6 Drawing Figures

INDICATION SYSTEM

BACKGROUND OF THE INVENTION

1. Field of the Invention

The present invention relates to a drum type indication system which searches a signal line producing a detection signal out of a plurality of signal lines and indicates an indication item relating to the detected signal line.

2. Description of the Prior Art

Prior art methods for detecting normal or abnormal function of various components of an automobile or the like and indicating the results include a method in which as many indication items as the number of items to be detected and illumination lamps for illuminating those items are arranged in a plane and a selected lamp is lit to illuminate a selected item, and a method in which a plurality of transparent acrylic plates each having an indication item engraved thereon are laminated and each of the plates is selectively illuminated by an illumination lamp provided for each of the plates to indicate a selected detection item.

However, those prior art methods have the following disadvantages. Namely, the former method of arranging as many indication lamps as the number of items to be detected requires a relatively large indication area and the latter method of laminating the transparent acrylic plates and illuminating a selected one of them by the lamp has a drawback in that one cannot easily view the indicated item because a light directed to an inner indication plate leaks to an outer indication plate so that the indication item on the unselected outer indication plate is also illuminated more or less.

SUMMARY OF THE INVENTION

The present invention is intended to overcome the above difficulties, and it is an object of the present invention to provide an indication system wherein an indication drum is rotated by a drive means including an oscillator circuit, and when any detection signal is selected out of a plurality of signal lines by a switch arm linked to the drum, the rotation of the drum is stopped to indicate a corresponding indication item, and thereafter a forcible actuation switch is actuated to again rotate the indication drum and the switch arm to search other detection signal, whereby a desired one of a plurality of detection items can be indicated in a simple manner with a smaller indication area.

Those and other objects, features and advantages of the present invention will be apparent from the following description of the preferred embodiments when taken in conjunction with the accompanying drawings.

BRIEF DESCRIPTION OF THE DARWINGS

DESCRIPTION OF THE PREFERRED EMBODIMENTS

Figure 1:
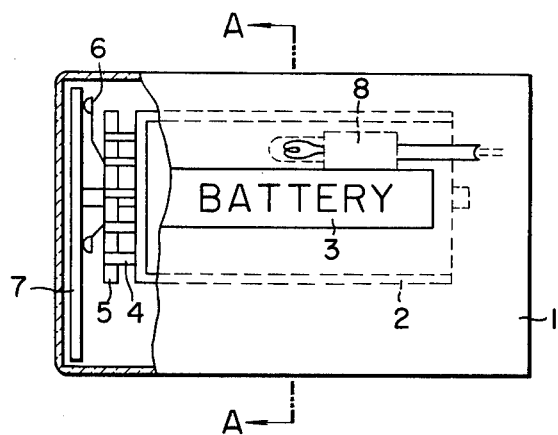
FIG. 1 is a front view, partly in section, of an indication system in accordance with the present invention.

The present invention is now explained in conjunction with the preferred embodiments thereof shown in the drawings.

Figure 2:
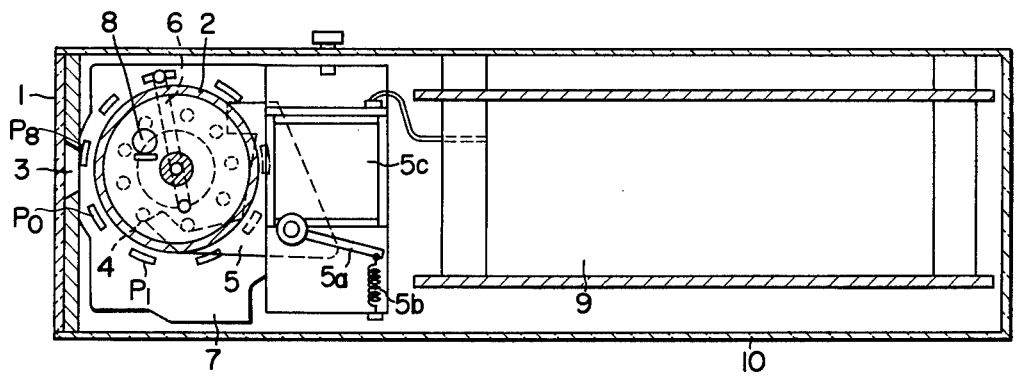
FIG. 2 is a sectional view taken along a line A—A in FIG. 1.

FIG. 1 shows a front view, partly in section, of an indication system in accordance with the present invention, and FIG. 2 is a sectional view taken along a line A—A in FIG. 1. In FIGS. 1 and 2, numeral 1 denotes an indication plate made of a transparent resin material or the like, 2 denotes an indication drum bearing desired indication items such as characters, patterns or symbols on an outer peripheral surface thereof, and 3 denotes an indication window formed in a body 10 of the indication system. In the illustrated example, characters "BATTERY" marked on the surface of the indication drum 2 is indicated by illumination by an illumination lamp 8. Numeral 4 denotes a projection fixed to or integral with the indication drum 2. The projection 4 is pushed and pulled by the reciprocation of a ratchet 5 to rotate the indication drum 2. The ratchet 5 is fixed to a rotary shaft of an armature $5a$ having one end connected with a spring $5b$ so that the ratchet 5 rotates with the rotary shaft as the armature $5a$ displaces. The projections 4, the ratchet 5 and the armature $5a$ form a ratchet mechanism. Numeral $5c$ denotes an electromagnet (solenoid) which, together with the armature $5a$, form an electromagnetic relay. Numeral 6 dentoes a brush forming a rotary contact which rotates which the indication drum 2 to sequentially make contact with stationary contacts $P_o$ to $P_8$ of conductive pattern printed on a printed circuit board 7 which is fixed to the body 10. Numeral 8 denotes the illumination lamp described above to illuminate the indication item on the surface of the indication drum 2, and numeral 9 denotes a control circuit which includes an electric circuit to drive and control the electromagnetic relay and the lamp 8.

Figure 3:
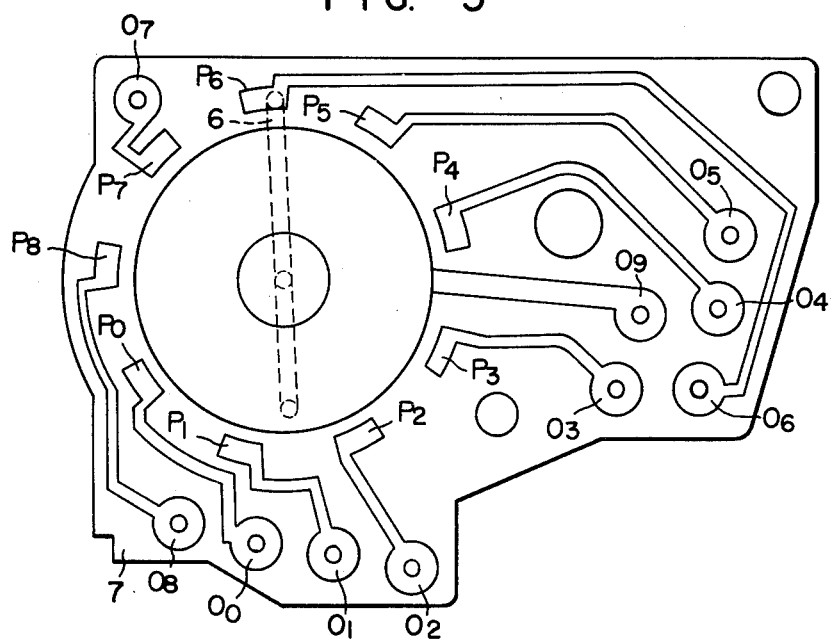
FIG. 3 shows the detail of a printed circuit board shown in FIGS. 1 and 2.

FIG. 3 shows the detail of the printed circuit board 7, in which conductive patterns are printed on the board 7 to form the stationary contacts $P_o$ to $P_8$. Output pads $O_o$ to $O_9$ are to be connected to the control circuit 9.

Figure 4:
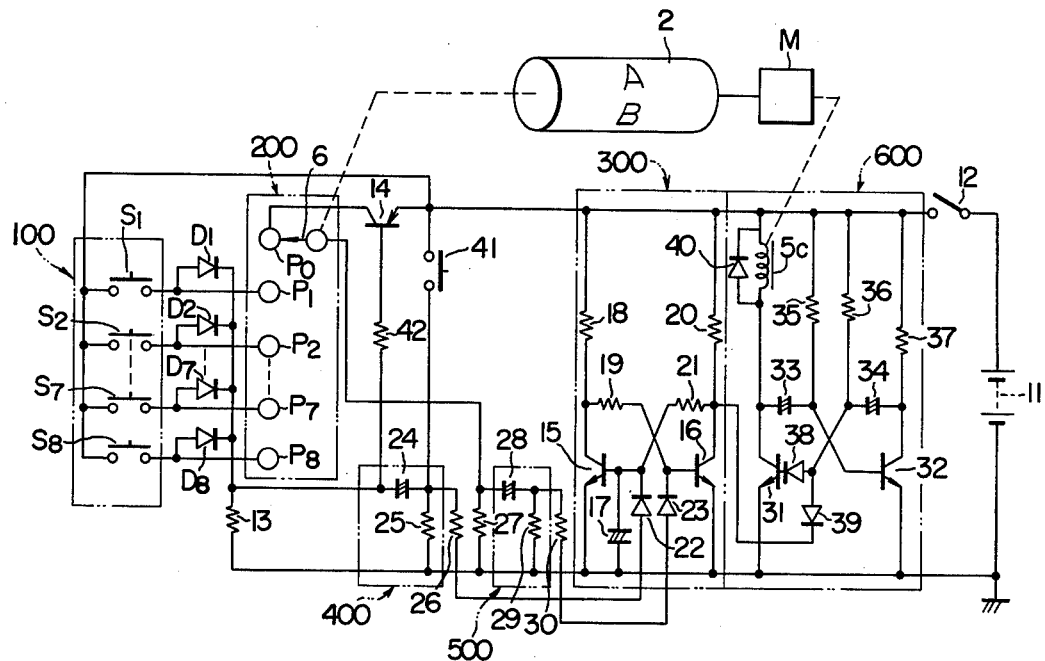
FIG. 4 is an electrical wiring diagram illustrating a first embodiment of a control circuit of the indication system of the present invention.

The control circuit of the indication system of the present invention is now explained. FIG. 4 shows a first embodiment of the control circuit, in which numeral 11 denotes a D.C. power supply such as a battery of an automobile and 12 denotes an actuation switch corresponding to an ignition switch of the automobile. Numeral 100 denotes a sensor circuit in which switches $S_1$ to $S_8$ denote normally open switches which are closed upon detection of abnormality in the quantity of brake oil or engine oil or in air pressure of tire in case of the automobile. The items to be detected by the switches $S_1$ to $S_8$ correspond to the indication items marked on the peripheral surface of the indication drum 2. $D_1$ to $D_8$ denote diodes for ORing the detection signals from the switches $S_1$ to $S_8$. The cathodes of the diodes $D_1$ to $D_8$ are grounded through a detection voltage generating resistor 13. Numeral 200 denotes a rotary switch, a specific example of which is shown in FIG. 3. It comprises the stationary contacts $P_o$ to $P_8$ and the rotary contact which is the brush 6 linked to the indication drum 2 rotate therewith. The stationary contacts $P_1$ to $P_8$ are connected to respective one ends of the switches $S_1$ to $S_8$ while the stationary contact $P_o$ serves as a normal indication contact for causing the rotary contact 6 to stop at the position of the stationary contact $P_o$ when all of the switches $S_1$ to $S_8$ are providing normal detection signals. The stationary contact $P_o$ is connected to a collector terminal of a PNP transistor 14 having a base connected to the cathodes of the cathodes of the diodes $D_1$ to $D_8$ through a resistor 42. Numeral 300 denotes a flip-flop circuit which comprises transistors 15 and 16, an initializing capacitor 17, resistors 18 to 21, and set-reset signal inputting diodes 22 and 23. Set and reset signals to the flip-flop circuit 300 are applied to the bases of the transistors 15 and 16 from differentiation circuit 400 comprising a capacitor 24 and a resistor 25 and a differentiation circuit 500 comprising a capacitor 28 and a resistor 29, through resistors 26 and 30 and diode 22 and 23, respectivly. Numeral 27 denotes a detection voltage generating resistor connected to the output terminal of the rotary contact 6. Numeral 600 denotes an oscillator circuit comprising an astable multivibrator which includes transistors 31 and 32, capacitors 33 and 34, resistors 35, 36 and 37, diodes 38, 39 and 40 and the solenoid 5c shown in FIG. 2. The oscillation of the oscillator circuit 600 is controlled by the output of the flip-flop circuit 300. The oscillation frequency of the oscillator circuit 600 is selected to be low enough to insure that the application of one oscillation pulse energizes the solenoid 5c to cause the indication drum 2 to rotate one step corresponding to one indication item so that the indication items on the indication drum 2 are sequentially stepped. M denotes a ratchet mechanism for rotating the indication drum 2 by the actuation of the solenoid 5c and comprises the armature 5a, the ratchet 5 and the projections 4 as shown in FIG. 2. Numeral 41 denotes a forcible actuation. Switch for checking circuit function and forcibly activating the oscillation. In the illustrated example, eight detection items are provided, and when the rotary contact 6 captures one of the stationary contacts $P_1$ to $P_8$ connected to each respective end of the switches $S_1$ to $S_8$, the indication item corresponding to the selected switch (one of the switches $S_1$ to $S_8$) appears under the indication window 3.

The operation of the system described above is now explained. First let us assume that all of the switches $S_1$ to $S_8$ are in their normal or open conditions and the indication drum 2 is at the normal indication position, that is, the rotary contact 6 is in contact with the normal indication contact $P_o$. Under this condition, when the actuation switch 12 is closed, the transistor 15 of the flip-flop circuit 300 is cut off because the capacitor 17 is connected between the base and the emitter thereof and hence the base is momentarily grounded. As a result, the transistor 16 of the flip-flop circuit 300 conducts. Thus, the current flowing through the resistor 36 is directed to the diode 39, and the collector-emitter of the transistor 16 and not to the base of the transistor 31. As a result, the transistor 31 does not conduct and the astable multivibrator 600 comprising the transistors 31 and 32 does not oscillate. Under this condition, if one of the switches $S_1$ to $S_8$ in the sensor circuit 100 detects an abnormality and is closed, the voltage across the detection voltage generating resistor 13, which has been at a potential divided by the resistor 42 through the base-emitter of the transistor 14, now rises to the full power supply voltage. The voltage increase across the resistor 13 is differentiated by the differentiation circuit 400 comprising the capacitor 24 and the resistor 25, and a positive differentiated pulse is applied through the resistor 26 and the diode 22 to the base of the transistor 15 in the flip-flop circuit 300 which is in the cut-off state. As a result, the transistor 15 conducts and the transistor 16 is rendered non-conductive. This state is maintained even after the termination of the differentiated pulse. As the transistor 16 becomes non-conductive and the collector voltage thereof rises to the power supply voltage, the diode 39 is rendered non-conductive and the astable multivibrator 600 comprising the transistors 31 and 32 starts to oscillate. The solenoid 5c is then energized in synchronism with the oscillation cycle so that the indication drum 2 which has indicated "normal" is stepped one indication item for each energization of the solenoid 5c. In this manner, the indication items A, B, . . . . . sequentially appear under the indication window 3. At the same time, the rotary contact 6 which has been at the normal indication contact $P_o$ of the rotary switch 200 is sequentially stepped to the stationary positions $P_1$, $P_2$, $P_3$ . . . . . , $P_8$.

Assuming that the switch $S_2$ is detecting an abnormality and closed. Then, the power supply voltage is being applied only to the contact $P_2$ out of the stationary contacts $P_o$ to $P_8$. Accordingly, when the rotary contact 6, which is sequentially stepped by the oscillation of the multivibrator 600, contacts the contact $P_2$, the power supply voltage is applied to the resistor 27 which has not been applied with the voltage, and the voltage across the resistor 27 is differentiated by the differentiation circuit 500 comprising the capacitor 28 and the resistor 29. A positive differentiated pulse is applied to the base of the transistor 16 which has been in the cutoff state, through the resistor 30 and the diode 23. As a result, the transistor 16 conducts and the transistor 15 is rendered non-conductive. This state is maintained even after the termination of the differentiated pulse. As the transistor 16 conducts, the diode 39 is rendered conductive and the current flowing through the resistor 36 no longer flows through the transistor 31. Thus, the astable multivibrator 600 comprising the transistors 31 and 32 stops oscillating and the solenoid 5c is no longer energized. As a result, the rotary contact 6 remains at the stationary contact $P_2$ and the indication drum 2 stops while indicating the indication item corresponding to the abnormal switch $S_2$. In this manner, a driver of the automobile is informed that the indicated item corresponding to the switch $S_2$ is abnormal.

When two or more of the eight switches $S_1$ to $S_8$ in the sensor circuit 100 detect an abnormality, for example, when the switches $S_2$ and $S_7$ are closed, the rotary contact 6 which has been at the position of the normal indication contact $P_o$ during the normal state is first stopped at the position of the stationary contact $P_2$. Then, the forcible actuation switch 41 which is a push button switch is momentarily closed. As a result, the transistor 15 which has been in the cutoff state is forcibly rendered conductive and the transistor 16 is rendered non-conductive. The flip-flop circuit 300 maintains this state. As the transistor 16 is rendered non-conductive, the diode 39 is rendered non-conductive and the multivibrator 600 starts oscillating and the solenoid 5c is energized so that the rotary contact 6 is stepped from the stationary contact $P_2$ to the stationary contact $P_7$. Since the power supply voltage is applied to the stationary contact $P_7$ as well as the stationary contact $P_2$, a differentiated voltage appears across the resistor 29 when the rotary contact 6 makes contact with the stationary contact $P_7$. As a result, the transistor 16 is rendered conductive and the transistor 31 is rendered non-conductive so that the solenoid 5c is no longer energized and the rotary contact 6 stops at the position of the stationary contact $P_7$ indicating the indication item corresponding to the abnormal detection switch $S_7$. Then, the forcible actuation switch 41 is again closed momentarily. The rotary contact 6 then rotates in a similar manner to that described above from the stationary contact $P_7$ past the stationary contacts $P_8$ and $P_1$ and stops again at the position of the stationary contact $P_2$. Thus, the indication drum 2 indicates the indication item corresponding to the abnormal switch $S_2$. In this manner, by depressing the forcible actuation switch 41, all items in the abnormal state can be sequentially indicated.

When all of the switches $S_1$ to $S_8$ of the sensor circuit 100 are in their normal or open states, the power supply voltage does not appear across the resistor 13 and a current flows through the resistors 42 and 13 to the transistor 14. As a result, the transistor 14 is conductive and the power supply voltage is applied to the normal indication contact $P_o$. Under this condition, when the forcible actuation switch 41 is momentarily closed, a positive differentiated pulse appears across the resistor 25 as described above so that the transistor 15 is rendered conductive and the transistor 16 is rendered non-conductive. As a result, the multivibrator 600 oscillates and the indication drum 2 which has indicated "normal" and the rotary contact 6 which has been at the position of the stationary contact $P_o$ are sequentially rotated. When the rotary contact 6 again makes contact with the normal indication stationary contact $P_o$ to which the power supply voltage is being applied, a positive differentiated pulse appears across the resistor 29 causing the transistor 16 to conduct. Thus, the transistor 31 is rendered non-conductive and the solenoid 5c is deenergized. As a result, the rotary contact 6 stops at the stationary contact $P_o$ and the drum 2 indicates "normal". In this manner, under the normal state, when the forcible actuation switch 41 is momentarily closed, the indication drum 2 is stepped from the "normal" position one indication item for each step and stopped again at the "normal" position. Thus, the function of the system can be checked.

Figure 5:
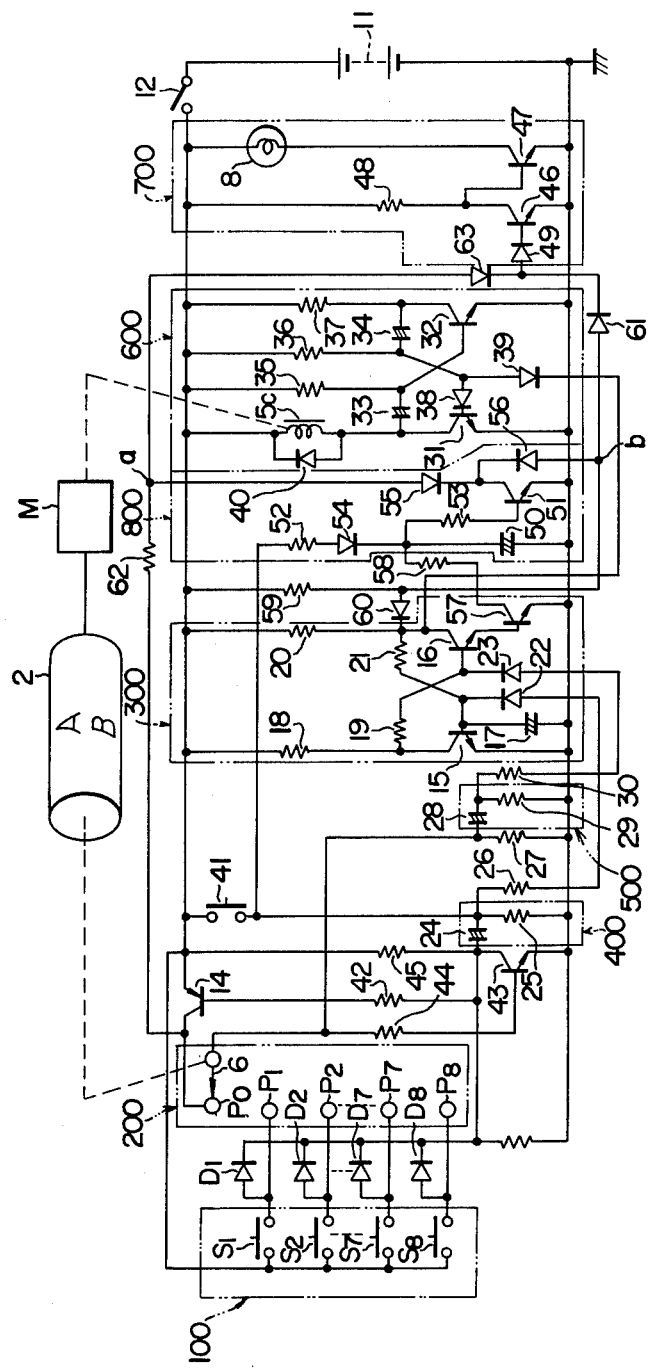
FIG. 5 is an electrical wiring diagram illustrating a second embodiment of the control circuit of the present system.

A second embodiment of the control circuit of the present system is shown in FIG. 5. In FIG. 5, numerals 1 to 42 denotes components having the same functions as corresponding ones shown in the first embodiment of FIG. 4. Numeral 43 denotes a transistor actuated depending on the output from the rotary contact 6, numerals 44 and 45 denote a base resistor and a collector resistor, respectively, of the transistor 43, and numeral 700 denotes an illumination circuit for illuminating the indication items marked on the outer peripheral surface of the indication drum 2 and comprises the illumination lamp 8, transistors 46 and 47, a resistor 48 and a diode 49. The lamp 8 is arranged within the indication drum 2 as shown in FIG. 1 to illuminate the translucent characters or symbols marked on the outer peripheral surface of the indication drum 2 when the lamp 8 is lit so that the characters are relieved by the transmitted light. Numeral 800 denotes a forcible illumination control circuit which comprises a capacitor 50, a transistor 51, resistors 52 and 53 and diodes 54, 55 and 56. During the oscillation of the astable multivibrator 600 of the oscillator circuit by the momentary closure of the forcible actuation switch 41 which causes the capacitor 50 to be rapidly charged and causes the transistors 16 and 57 to be non-conductive, the control circuit 800 serves to discharge the charge stored in the capacitor 50 through the base-emitter of the transistor 51 to render the same conductive so that a point a or b in the base current supplying path to the base of the transistor 46 in the illumination circuit 700, that is, the path including the resistor 59 and the diode 61 or the path including the resistor 62 and the diode 63, assumes a low level, whereby the transistor 46 is rendered non-conductive and the transistor 47 is rendered conductive to energize the illumination lamp 8.

The difference between the second embodiment of FIG. 5 and the first embodiment of FIG. 4 lies in that the following two functions are added to the second embodiment. Firstly, in the first embodiment, once an item is indicated as abnormal, the abnormal indication is not released even if the sensor corresponding to the abnormal indication thereafter indicates normal unless the actuation switch 12 is once turned off or the forcible actuation switch 41 is momentarily closed, but, in the second embodiment, when the sensor restores the normal state, the indication drum 2 automatically rotates to the normal indication position or to another abnormal item position, of any. Secondly, the lamp 8 illuminates the indication item on the indication drum 2 in a continuous manner when the characters on the indication drum 2 are being indexed by the actuation of the forcible actuation switch 41 and during a time period from the stop of the indication drum 2 at the abnormal indication position to the release of the abnormal state when a sensor indicates the abnormal state and the indication drum 2 is stepped.

The operation of the second embodiment of FIG. 5 is now explained. When the switch $S_2$, for example, of the sensor circuit 100 detects the abnormal state and is closed, the rotary contact 6 rotates to the position of the stationary contact $P_2$ in a manner described in connection with the first embodiment and the indication drum 2 indicates the indication item corresponding to the switch $S_2$. Since the power supply voltage is being applied to the stationary contact $P_2$ at this time, a current flows into the base of the transistor 43 through the resistor 44. Thus, the transistor 43 is conductive and no charge is stored in the capacitor 24. Now, if the switch $S_2$ restores the normal state and is opened, the base current of the transistor 43 no longer flows and the transistor 43 is rendered non-conductive. The rise at the collector voltage of the transistor 43 is differentiated by the differentiation circuit 400 comprising the capacitor 24 and the resistor 25, and a positive differentiated pulse is applied through the resistor 26 and the diode 22 to the base of the transistor 15 which has been in the cutoff state. As a result, the transistor 15 is rendered conductive and the transistor 16 is rendered non-conductive. This state is maintained even after the termination of the differentiated pulse. Under this condition, since the diode 39 is non-conductive, the multivibrator comprising the transistors 31 and 32 starts to oscillate and the solenoid 5c is energized in synchronism with the oscillation cycle, and the indication drum 2 and the rotary contact 6 start to rotate. When the rotary contact 6 reaches the normal indication contact $P_o$ to which the power supply voltage is being applied, it stops rotation. In this manner, if the abnormal detection item restores to the normal state, the indication drum 2 automatically rotates to the normal position to indicate a normal indication.

The lighting control of the illumination lamp 8 is now explained. When all of the items are normal, the power supply voltage is applied to the stationary contact $P_o$ and a current flows to the base of the transistor 46 through the resistor 62 and the diode 63 and 49. Thus, the transistor 46 is conductive and the transistor 47 is non-conductive so that the lamp 8 is turned off. If at least one item of the switches $S_1$ to $S_8$ in the sensor circuit 100 indicates abnormal and the corresponding switch is closed, the power supply voltage is applied to the resistor 13 and the transistor 14 is rendered non-conductive and the current no longer flows to the base of the transistor 46 through the resistor 62. However, as described above, when at least one of the items of the switches $S_1$ to $S_8$ indicates abnormal, the transistor 16 is rendered non-conductive until the rotary contact 6 reaches the position of the abnormal item contact. Accordingly, a current flows to the base of the transistor 46 through the resistor 59 and the diodes 61 and 49. Thus, the transistor 46 is rendered conductive and the transistor 47 is rendered non-conductive. Accordingly, the lamp 8 remains turned off. As the rotary contact 6 rotates to make contact with that contact of the stationary contacts $P_1$ to $P_8$ which is indicating the abnormal and the which the power supply voltage is being applied, the transistor 16 conducts in the manner described above and the transistor 15 is rendered non-conductive. As the transistor 16 conducts, the base current to the transistor 46 is bypassed by the diode 60 and no longer flows thereto. As a result, the transistor 47 is rendered conductive causing the lamp 8 to turn on. In this manner, whether all of the items are normal or one of them is abnormal, the lamp 8 is not lit during the rotation of the drum 2 and the rotary contact 6 and it is lit only when the rotary contact 6 stops at the abnormal item contact to illuminate the indication content of the abnormal item.

When it is desired to check if all of the indication items are properly indicated, the forcible actuation switch 41 is momentarily closed so that the capacitor 50 in the forcible illumination control circuit 800 is rapidly charged to approximately the power supply voltage through the low resistor 52 and the diode 54. The charge stored then flows into the base of the transistor 51 through the high resistor 53, maintaining the transistor 51 in the conductive state until the capacitor 50 is substantially discharged. As a result, irrespective of the presence or absence of the voltage at the stationary contact $P_o$, the transitor 46 is kept non-conductive and the transistor 47 is rendered conductive to light the lamp 8. When the rotary contact 6 completes one revolution and comes back to the position of the normal indication contact $P_o$, the transistor 16 is rendered conductive. As a result, the transistor 57 is rendered conductive and the remaining charge in the capacitor 50 is discharged in a short time through the low resistor 58. Thus, the transistor 51 is rendered non-conductive and the voltage at the normal indication contact $P_o$ is applied to the base of the transistor 46 through the resistor 62 and the diodes 63 and 49. As a result, the transistor 47 is rendered non-conductive and the lamp 8 is turned off. In this manner, during the check operation, all of the indication items are illuminated by the lamp 8 and the lamp 8 is turned off after the completion of one revolution.

While the embodiments described above use the normally open sensors as the switches $S_1$ to $S_8$ of the sensor circuit 100 such that they are open in the normal state and closed in the abnormal state, normally closed sensors may be used such that they are closed in the normal state and open in the abnormal state. In this case, however, the sensor circuit 100 should be arranged such that no voltage is applied to the stationary contacts $P_1$ to $P_8$ in the normal state and a voltage is applied to selected ones of them in the abnormal state.

As described hereinabove, the indication system of the present invention comprises a signal line selector having a switch arm for selecting one of detection signals from a plurality of signal lines, an indication drum linked to the switch arm to move therewith and bearing indication items corresponding to the plurality of signal lines on a peripheral surface thereof, a drive means including an oscillator circuit for driving the indication drum, a logic circuit for ORing the detection signals from the plurality of signal lines, a flip-flop circuit for controlling the operation of the oscillator circuit in response to an output from the switch arm and an ORed output from the logic circuit, a forcible actuation switch, and a means for forcibly activating the oscillator circuit in response to the actuation of the forcible actuation switch irrespective of the selected condition of the switch arm. Accordingly, the present invention provides the advantages that a plurality of detection items can be indicated in a smaller indication area and the reliability of the detection operation is improved.

Figure 6:
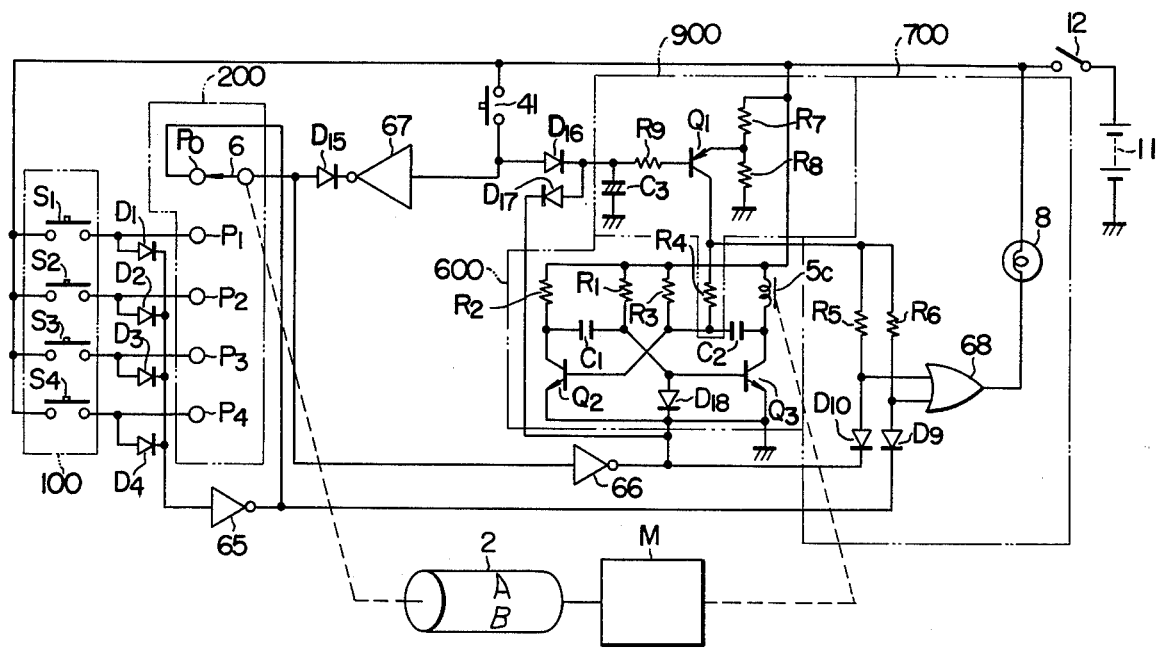
FIG. 6 is an electrical wiring diagram illustrating a third embodiment of the control circuit of the present system.

Referring now to FIG. 6, a further embodiment of the present invention is described. In FIG. 6, the same reference numerals as in FIG. 5 are used to indicate the corresponding parts. Like in the previous embodiment, numeral 100 denotes the sensor circuit which comprises the normally open sensors which are closed when the abnormality of the quantity of brake oil or engine oil or tire air pressure, in the case of automobiles, is detected. The switches $S_1$ to $S_4$ correspond to the indication items marked on the outer peripheral surface of the indication drum 2. $D_1$ to $D_4$ denote diodes for ORing the detection signals from the switch $S_1$ to $S_4$, that is, forming an OR circuit. The cathodes of the diodes $D_1$ to $D_4$ are connected to an inverter 65.

Numeral 200 denotes a rotary switch having the stationary contacts $P_0$ to $P_4$ connected to respective ends of the switches $S_1$ to $S_4$ and an output of the inventer 65, and the rotary contact 6 linked to the indication drum 2 to rotate therewith so that it sequentially makes contact with the stationary contacts $P_0$ to $P_4$. Numeral 600 denotes the oscillator circuit to control the rotation of the indication drum 2. In the illustrated embodiment, the oscillator circuit 600 is an astable multi-vibrator comprising transistors $Q_2$ and $Q_3$, resistors $R_1$ to $R_3$, capacitors $C_1$ and $C_2$, and the solenoid 5c. The solenoid 5c and the indication drum 2 are mechanically coupled together by a conventional ratchet type counter mechanism M in such a manner that each time the solenoid 5c is energized by an oscillation pulse from the oscillator circuit 600, the ratchet is actuated to sequentially step the indication drum 2. A diode $D_{18}$ is inserted in an oscillation control line to the oscillator circuit 600. When the rotary contact 6 selects a high (H) level signal, an inverter 66 absorbs a base current to the transistor $Q_3$ through the diode $D_{18}$ to stop the oscillation.

Numeral 900 denotes an oscillation frequency control circuit for changing an oscillation frequency of the oscillator circuit 600. It comprises a transistor $Q_1$, resistors $R_4$, $R_7$ to $R_9$ and a capacitor $C_3$. When the transistor $Q_1$ is conductive, a current is supplied through the resistor $R_4$ to the base of the transistor $Q_2$ to change a time constant CR which determines the oscillation frequency. The capacitor $C_3$ and the resistor $R_9$ constitutes a timer circuit a timer period of which is longer than a time period required for the rotary contact 6 to complete at least one revolution. Numeral 700 denotes the illumination circuit for illuminating the indication items on the peripheral surface of the indication drum 2. It comprises an OR gate 68, resistors $R_5$ and $R_6$, diodes $D_9$ and $D_{10}$ and the illumination lamp 8. Numeral 11 denotes the D.C. power supply, and numeral 41 denotes the forcible actuation switch for searching other high level input signal after the rotary contact 6 has selected one high level signal. It is connected to the inverter 67 and a diode $D_{15}$, and further to the diodes $D_{16}$ and $D_{17}$ and the capacitor $C_3$. When the switch 41 is closed, the output terminal of the rotary contact 6 is forced to the low (L) level and the capacitor $C_3$ is rapidly charged through the diode $D_{16}$ to turn off the transistor $Q_1$ so that the oscillator circuit 600 is forced to oscillate. In this case, the oscillation frequency is lower than that during the conduction of the transistor $Q_1$ so that the indication drum 2 is rotated at a lower speed. Numeral 12 denotes the power switch or the actuation switch.

The operation of the circuit described above is now explained. When the power switch 12 is closed, the outputs of the inverter 65 and the contact $P_0$ are at H level if all of the switches $S_1$ to $S_4$ are open. If the rotary contact 6 is at the position of the contact $P_0$, the output of the inverter 66 is at L level and absorbs the base current to the transistor $Q_3$. As a result, the astable multivibrator in the oscillator circuit 600 stops oscillating and the solenoid 5c is not energized. Under this condition, if the switch $S_1$, for example, is closed, the H level signal is applied to the inverter 65 through the diode $D_1$ and the contact $P_0$ assumes L level. Thus, the output of the inverter 66 assumes H level and the oscillator circuit 600 starts to oscillate so that the solenoid 5c is energized to sequentially rotate the indication drum 2 and the rotary contact 6. At this time, the potential of the capacitor $C_3$ forming the timer circuit is low and a charging current thereto flows as the base current to the transistor $Q_1$ to turn on the transistor $Q_1$. As a result, the resistor $R_4$ is connected in parallel to the resistor $R_3$ of the oscillator circuit 600 so that the time constant CR is reduced resulting in the increase in the oscillation frequency.

When the rotary contact 6 makes contact with the contact $P_1$, the output of the inverter 66 assumes L level and the charge stored in the capacitor $C_3$ is discharged through the diode $D_{17}$ and the oscillator 600 stops oscillating. Under this condition, the outputs of the inverters 65 and 66 are both at L level and absorb current through the transistors $Q_1$ and the resistors $R_5$ and $R_6$. As a result, the output of the OR gate 68 assumes L level and the lamp 8 is lit to illuminate the indication item on the surface of the drum 2 corresponding to the switch $S_1$. Under this condition, even if another switch, e.g. the switch $S_3$ is closed, no change occurs in the states of the solenoid 5c and the lamp 8.

Under this condition, when the forcible actuation switch 41 is temporarily turned on to search an H level at the other switches $S_2$, $S_3$ and $S_4$, the output level of the inverter 67 assumes L level and absorbs the H level signal from the rotary contact 6. As a result, the output of the inverter 66 assumes H level and the oscillation circuit 600 starts to oscillate.

By the closure of the forcible actuation switch 41, the capacitor $C_3$ is momentarily charged and the transistor $Q_1$ is turned off. As a result, the current flowing through the resistor $R_4$ terminates and the time constant CR determined by the resistor $R_3$ is increased. Thus, the oscillator circuit 600 oscillates at a relatively low oscillation frequency to sequentially step the drum 2 and the rotary contact 6 at a lower speed. By the turn-off of the transistor $Q_1$, the current flowing through the resistors $R_5$ and $R_6$ terminates and the output of the OR gate 68 assumes L level. As a result, the illumination lamp 8 remains energized. Then, when the rotary contact 6 reaches the contact $P_3$ which is providing the H level output by the closure of the switch $S_3$, for example, the output of the inverter 66 assumes L level and the oscillator circuit 600 stops oscillating. As a result, the lamp 8 remains energized to illuminate the indication item on the outer periphery of the indication drum 2 corresponding to the switch $S_3$.

While the above embodiment uses the solenoid 5c to form the ratchet mechanism to drive the indication drum 2, any other means such as a stepping motor which is rotated by pulse signals may be used.

Furthermore, while the drum 2 is used in the above embodiment, it may be replaced by a belt-like film bearing characters or symbols thereon. The number of the signal lines is not limited to four shown in the above embodiment but any desired number of signal lines may be used. The astable multivibrator used as the oscillator 600 may be replaced by any other oscillator.

As described hereinabove, the indication system of the present invention comprises a signal line selector having a switch arm for selecting one of detection signals from a plurality of signal lines, an indication drum linked to the switch arm to move therewith and bearing indication items corresponding to the plurality of signal lines on an outer peripheral surface thereof, a drive means including an oscillator circuit for driving the indication drum, a control means for controlling the operation of the oscillator circuit in response to an output from the switch arm, a forcible actuation switch, and a means for forcibly activating the oscillator circuit in response to the actuation of the forcibly actuation switch irrespective of the selected condiction of the switch arm. Accordingly, when two or more signal lines are simultaneously producing the detection signals, one of them is first indicated and then the remaining signal lines are searched by actuating the forcible actuation switch. Therefore, the present invention provides an advantage that a plurality of indication items can be indicated in a simple way by a relatively simple construction.

What is claimed is:
1. An indication system comprising:
   a plurality of on-off switches for respectively generating detection signals indicative of abnormal conditions in response to either on or off conditions thereof;
   a rotary switch having a movable contact and a plurality of stationary contacts being respectively connected to said on-off switches to be supplied with said detection signals;
   an indication drum coupled to said switch for causing said movable contact to slide over said stationary contacts during the rotation thereof, said indication drum being recorded with a plurality of marks thereon corresponding to respective abnormal conditions detected by said on-off switches;
   a manual switch operative manually to generate a command signal;

first means for generating a first signal in response to either one of said detection signals or said command signal;

second means for generating a second signal in response to the contact of said movable contact with one of said stationary contacts supplied with corresponding one of said detection signals; and actuating means for rotating said indication drum in response to said first signal applied from said first means and stopping said indication drum in response to said second signal applied from said second means.

2. An indication system according to claim 1 further comprising:

a lamp, provided in said indication drum to be energized while said indication drum is stopped, for illuminating one of said marks which corresponds to one of said on-off switches generating said detection signals.

3. An indication system according to claim 1, wherein said actuating means includes:

an oscillator connected to said first and second means for generating an oscillating signal of a fixed frequency from the generation of said first signal to the generation of said second signal; and an electromagnetic actuator connected to said oscillator for rotating said indication drum stepwisely in response to said oscillation signal.

4. An indication system according to claim 1, wherein said actuating means includes:

a flip-flop connected to said first means to be set by said first signal and connected to said second means to be reset by said second signal;

an oscillator connected to said flip-flop for generating an oscillation signal of a fixed frequency while said flip-flop is in the set condition;

an electromagnetic actuator connected to said oscillator for rotating said indication drum stepwisely in response to said oscillation signal.

5. A system according to claim 2, wherein said actuating means includes:

a flip-flop connected to said first means to be set by said first signal and connected to said second means to be reset by said second signal;

an oscillator connected to said flip-flop for generating an oscillation signal of a fixed frequency while said flip-flop is in the set condition; and an electromagnetic actuator connected to said oscillator for rotating said indication drum stepwisely in response to said oscillation signal.

6. An indication system comprising:

selector means, adapted for selective reception of respective sensor signals generated in response to and indicative of respective abnormal conditions, and respective sensor signals generated on respective signal lines associated therewith, for sequentially establishing electrical connection of an output terminal to said respective signal lines;

an indication drum, cooperating with said selector means to rotate in accordance with the electrical connection established by said selector means, and bearing indicia of said respective abnormal conditions on an outer peripheral surface thereof;

drive means, including an oscillator circuit and responsive to inhibit and enable signals applied thereto, for controllably rotating said indication drum and correspondingly sequencing said selector means;

manual actuator means, for selectively generating a command signal;

first means, responsive to said respective sensor signals and said command signal, for generating said enable signal to said drive means in response to generation of any of such signals;

second means, connected to said selector means output terminal for electrical connection to said respective signal lines in sequence for generating said inhibit signal to said drive means in response to the first received of said respective sensor signals, whereby said indicator is stopped to display indicia of the abnormal condition associated with said first received sensor signal;

subsequent activation of said manual activator means causing generation of said enable signal to effect further rotation of said indicator drum and corresponding sequencing of said selector means until the next reception of a sensor signal by said second means.

7. The system of claim 6 further including:

means for automatically generating said enable signal to said drive means to effect further rotation of said indication drum and corresponding sequencing of said selector means upon extinction of a sensor signal received by said second means.

8. An indication system comprising:

selector means, adapted for selective reception of respective sensor signals generated in response to and indicative of respective abnormal conditions, said respective sensor signals generated on respective signal lines associated therewith, for sequentially establishing electrical connection of an output terminal to said respective signal lines and to a further contact associated with normal conditions;

an indication drum, cooperating with said selector means to rotate in accordance with the electrical connection established by said selector means, and bearing indicia of said respective abnormal conditions and on indicia of normal conditions on an outer peripheral surface thereof;

an oscillator, responsive to control signals applied thereto for selectively generating a drive signal;

drive means, responsive to said drive signal for selectively effecting rotation of said indicator drum and corresponding sequencing of said selector means;

a NOR circuit, connected to said respective signal lines, for generating at an output terminal thereof a low level output signal in response to the generation of a sensor signal on any of said signal lines, said NOR circuit output terminal being connected to said selector means further contact and to said oscillator, said low level signal being applied as enable control signal to said oscillator to effect activation thereof;

a first inverter connected between said selector means output terminal and said oscillator for generating a low level signal when said selector means establishes electrical connections to one of said signal lines on which a sensor signal is generated and, if no sensor signals are generated, when an electrical connection is established to said further contact, said low level signal being applied as an inhibit control signal to said oscillator to effect inactivation of said oscillator whereby said indicator drum is stopped to display indicia of the abnormal conditions associated with the signal line to which said sensor signal is generated or indicia of normal conditions associated with said further contact;

manual actuating means, including a second inverter connected to said selector means output terminal, for generating a low level signal at the output terminal of said NOR circuit and a high level signal at the output terminal of said first inverter, to effect activation of said oscillation, whereby said indicator drum and selector means are driven until said selector means next establishes a connection to cause said first inverter to generate a low level signal.

9. The system of claim 8 further including frequency control means, responsive to said manual activation means and cooperating with said oscillator for changing the time constant of said oscillator to control the frequency of said drive signal.

10. The system of claim 9 wherein said frequency control means comprises a timing capacitor and discharging means for providing a selective discharge path to the output terminal of said first inverter whereby said timing capacitor is reset in response to said selector means establishing a connection to cause the generation of a low level signal by said first inverter.

11. The system of claim 10 further comprising means, responsive to said NOR circuit output signals for selectively illuminating said indicator drum during periods when any of said sensor signals are generated.

* * * * *